United States Patent
Carothers

(10) Patent No.: US 8,701,790 B2
(45) Date of Patent: Apr. 22, 2014

(54) VIBRATORY PLOW ASSEMBLY

(75) Inventor: James L. Carothers, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 1681 days.

(21) Appl. No.: 11/624,572

(22) Filed: Jan. 18, 2007

(65) Prior Publication Data

US 2007/0163788 A1 Jul. 19, 2007

Related U.S. Application Data

(60) Provisional application No. 60/760,093, filed on Jan. 18, 2006.

(51) Int. Cl.
*A01B 35/00* (2006.01)

(52) U.S. Cl.
USPC .................................................. 172/40

(58) Field of Classification Search
USPC ........................................ 172/40, 474, 484
See application file for complete search history.

(56) References Cited

U.S. PATENT DOCUMENTS

| | | | | |
|---|---|---|---|---|
| 2,155,044 A * | 4/1939 | Gray et. al. | ................... | 405/181 |
| 2,493,811 A * | 1/1950 | Graham | ........................ | 172/657 |
| 3,103,250 A * | 9/1963 | Lamb | ................................ | 172/40 |
| 3,336,985 A * | 8/1967 | Rogers | ............................. | 172/40 |
| 3,398,798 A * | 8/1968 | Shelton | ............................. | 172/1 |
| 3,425,496 A * | 2/1969 | Shelton | ............................. | 172/40 |
| 3,502,152 A * | 3/1970 | Johnson | ........................... | 172/40 |
| 3,539,018 A * | 11/1970 | Sprenkel | ...................... | 172/484 |
| 3,627,056 A * | 12/1971 | Rogers | ............................. | 172/10 |
| 4,164,982 A | 8/1979 | Draney | | |
| 4,463,509 A | 8/1984 | Leonard | | |
| 4,750,566 A * | 6/1988 | Lindstrom | ...................... | 172/40 |
| 5,121,800 A * | 6/1992 | Gabriel | ........................... | 172/54 |
| 5,482,121 A | 1/1996 | Draney et al. | | |
| 6,244,355 B1 | 6/2001 | Hall | | |
| 6,681,867 B2 * | 1/2004 | Satzler | ........................... | 172/619 |

\* cited by examiner

*Primary Examiner* — Thomas B Will
*Assistant Examiner* — Joel F. Mitchell
(74) *Attorney, Agent, or Firm* — Tomlinson Rust McKinstry Grable

(57) ABSTRACT

A linkage assembly for a vibratory plow. A vibratory plow comprises a power unit and a vibratory plow assembly. The vibratory plow assembly has a linkage assembly to connect to the power unit. The linkage assembly comprises a lift trolley, an upper arm, a lower arm and a load transfer link. The upper arm is pivotally connected to an upper end of the lift trolley. The lower arm is pivotally connected to a lower end of the lift trolley. A vibrator assembly is connected to the upper arm and the lower arm and a plow assembly comprising a plow blade is connected to the vibrator assembly. The load transfer link is operatively connected to the upper arm and to the vibrator. The load transfer link may be a leaf spring with an intermediate link. Alternatively, the load transfer link may be a hydraulic cylinder or an elastomeric member.

18 Claims, 3 Drawing Sheets

VIBRATORY PLOW ASSEMBLY

CROSS REFERENCE TO RELATED APPLICATIONS

This application claims priority of U.S. Provisional Patent Application No. 60/760,093, filed Jan. 18, 2006, the contents of which are incorporated fully herein by reference.

FIELD OF THE INVENTION

The present invention relates to the field of construction equipment and more particularly to vibratory plows.

SUMMARY OF THE INVENTION

The present invention is directed to a linkage assembly for use with a vibratory plow. The assembly comprises an arm, a vibrator assembly connected to the arm, and a load transfer link. The load transfer link is operatively connected at a first point to the arm, and is operatively connected at a second point to the vibrator assembly.

In another aspect, the invention is directed to a vibratory plow comprising a power unit, a lift cylinder, a linkage assembly, a vibrator assembly, and a plow assembly. The linkage assembly comprises a lift trolley, an upper arm having a first end pivotally connected to an upper end of the lift trolley, a lower arm pivotally connected to a lower end of the lift trolley, and a load transfer link. The vibrator assembly is connected to the upper arm and the lower arm. The plow blade assembly comprises a plow blade and is connected to the vibrator. The load transfer link is operatively connected at a first connection point to the upper arm and at a second connection point to the vibrator. The lift cylinder is adapted to operatively connect the power unit with the lift trolley.

DETAILED DESCRIPTION OF THE INVENTION

Figure 1:
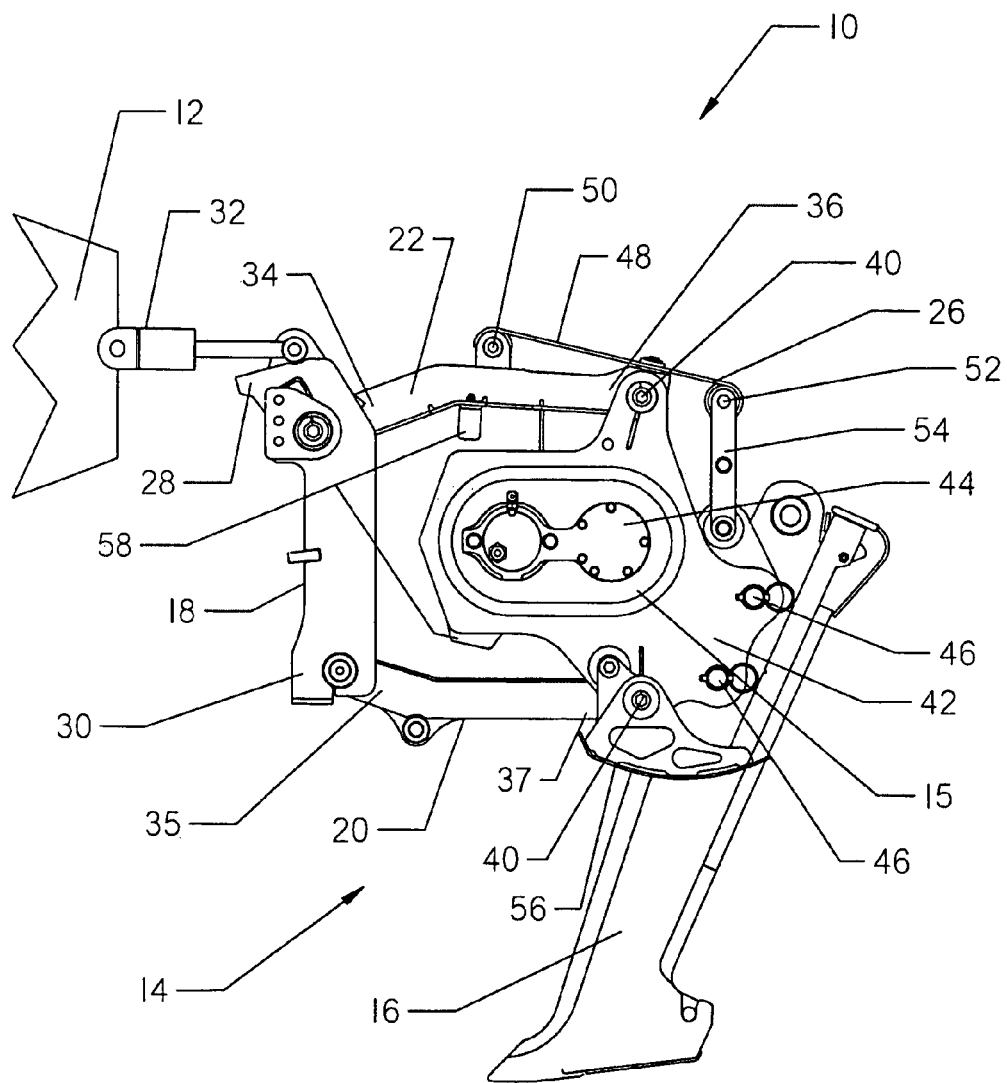
FIG. 1 illustrates a linkage assembly for a vibratory plow in accordance with the present invention.

With reference now to the drawings and to FIG. 1 in particular, shown therein is a vibratory plow assembly 10 built in accordance with the present invention. The vibratory plow 10 is attached to a tool carrier 12 or other power unit. The plow assembly 10 comprises a linkage assembly 14, a vibratory assembly 15, and a plow blade assembly or plow blade 16. The linkage assembly 14 is adapted to operatively connect the vibratory assembly 15 with the tool carrier 12. The linkage assembly 14 comprises a lift trolley 18, a lower arm 20, an upper arm 22, and a load transfer link 26. The lift trolley 18 comprises a first end 28 and a second end 30 and operatively connects the linkage assembly 14 to the tool carrier 12. Preferably, a lift cylinder 32 is connected between the tool carrier 12 and the linkage assembly 14. The lift cylinder 32 may be operated to control the lift, or height, of the plow assembly 10 and, as is yet to be described, the plow blade 16. In the preferred embodiment, the lift cylinder 32 is connected proximate the first end 28 of the lift trolley 18.

The upper arm 22 and the lower arm 20 each comprise a first end and a second end. The first end 34 of the upper arm 22 is connected to the first end 28 of the lift trolley 18. The first end 35 of the lower arm 20 is connected to the second end 30 of the lift trolley 18. The vibrator assembly 15 is connected to the second end 36 of the upper arm 22 and the second end 37 of the lower arm 20 at respective connections 40. The second end 36 of the upper arm 22 and the second end 37 of the lower arm 20 preferably comprise pin assemblies to facilitate the connections 40.

The vibrator assembly 15 comprises a vibrator housing 42, a vibrating mechanism 44, and a plow connection 46 disposed at an aft end of the vibrator for connection to the plow blade 16. In the preferred embodiment, the vibrator housing 42 defines an upper pin boss and a lower pin boss for the connection points 40 to the upper arm 22 and the lower arm 20 respectively. The vibrator housing 42 supports the vibrating mechanism 44. The vibrating mechanism 44 is adapted to impart vibration to the plow blade 16 to create a trench as the tool carrier 12 moves across the ground.

The extension or retraction of the lift cylinder 32 causes the lift trolley 18 to rotate relative to the tool carrier 12. Rotating the lift trolley 18 incrementally during plowing can control the pitch of the plow blade 16. Keeping the plow blade 16 at a desired pitch keeps the plow from creating too much drag or riding out of the ground.

With continuing reference to FIG. 1, the load transfer link 26 is provided to give vibration and load control to the linkage assembly 14. In the preferred embodiment, the load transfer link 26 comprises a leaf spring 48 connecting the upper arm 22 and the vibrator 15. The leaf spring 48 preferably has three connection points with the linkage assembly 14. A center portion of the leaf spring 48 is fixed to the second end 36 of the upper arm 22 proximate the connection 40 between the upper arm and the vibrator assembly 15. Preferably, the leaf spring 48 is secured with a vibration isolator. At a second connection point 50, the leaf spring 48 has a first end pivotally connected to the upper arm 22 between the first end 34 and the second end 36. A third connection point 52 is created where a second end of the leaf spring 48 is pivotally connected to the vibrator assembly 15.

In the preferred embodiment, an intermediate link 54 is used to connect the second end of the leaf spring 48 to the vibrator assembly 15 with a vibration isolator. As shown, the intermediate link 54 comprises a shackle. Alternatively, the intermediate link 54 comprises an elastomeric spring member. The elastomeric member preferably may be biased in either direction depending on soil conditions. In other alternative embodiments, the intermediate link 54 comprises a shock absorber, coil spring or hydraulic cylinder.

The spring 48 shown in the embodiment of FIG. 1 is a single leaf spring. Alternatively, a multi-leaf spring configuration may be used either in a symmetrical geometry or offset above or below the main leaf spring if additional biasing of float or down pressure is desired. The design of the preferred embodiment allows a soft, flexible spring 48 with ample linkage travel when the plow 10 rises or falls with ground contour. This design does not impart excessive, unwanted loads to the upper arm 22 or undesired vibration to the tool carrier 12.

With continued reference to FIG. 1, the vibratory plow assembly 10 further comprises a skid shoe 56. The skid shoe 56 is preferably attached to the vibrator 15 proximate the connection 40 to the lower arm 20. The skid shoe 56 is adapted to allow the plow assembly 10 to ride directly on the ground.

The linkage assembly 14 preferably further comprises over-travel bumpers 58 between the upper arm 22 and lower arm 20 and the vibrator 15 to limit how far the vibrator can travel within the linkage. Enough travel is provided to allow for plowing through most depressions or rises without the over-travel bumpers 58 contacting.

One skilled in the art will appreciate the operation of the linkage assembly 14 of FIG. 1 as described. The leaf spring 48 is shown at a no-load condition when the plow blade 16 is centered in the linkage assembly 14 and the linkage assembly is resting on the skid shoes 56. As the plow blade 16 is pulled along the ground, the leaf spring 48 will be deflected up or down. The force from this deflection tends to restore the blade 16 to the design position.

In some soil conditions it may be necessary to bias the leaf spring 48 to help carry the plow blade 16 or to impart additional weight on the skid shoes 56. An adjustable length shackle system could be used to control the load on the skid shoes 56. Alternatively, another means of controlling the float, such as with a coil spring, elastomeric spring, or hydraulic cylinder, may be used instead of a shackle.

Figure 2:
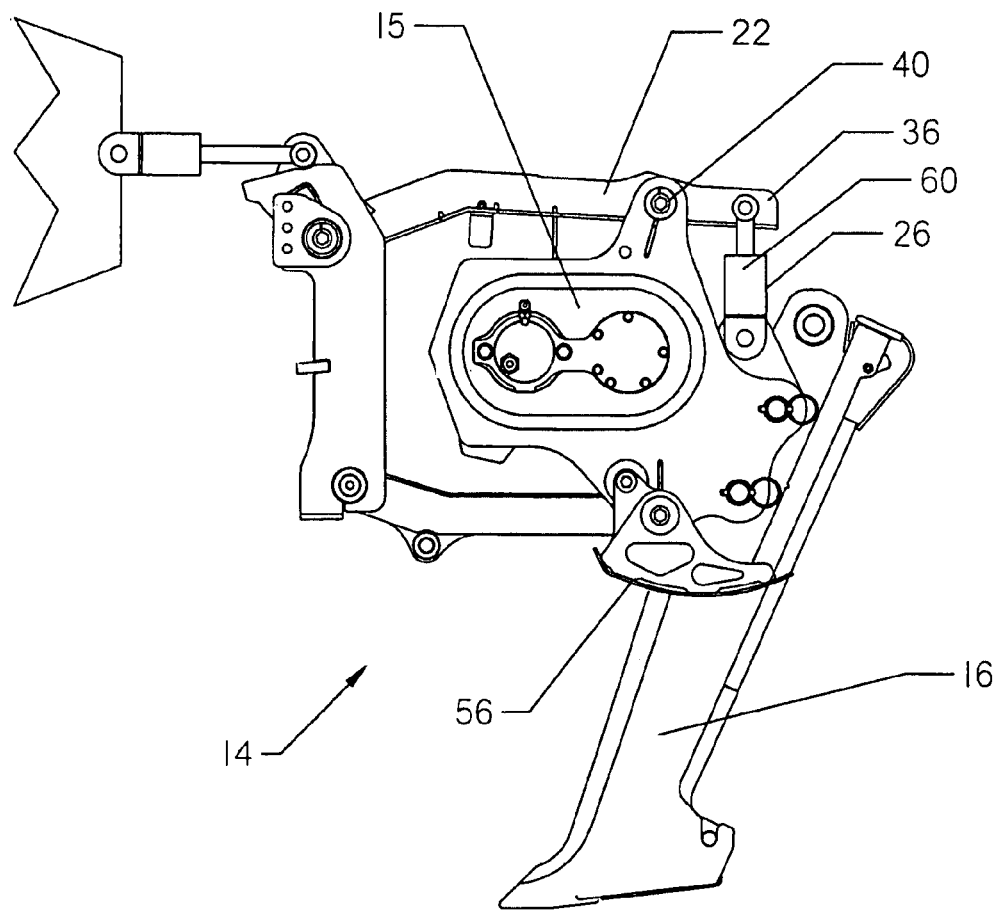
FIG. 2 illustrates an alternative embodiment for the linkage assembly of FIG. 1.

Referring now to FIG. 2, an alternative embodiment of the linkage assembly 14 is shown. In the alternative embodiment, the upper arm 22 is connected to the vibrator assembly 15 at a connection point 40 proximate the second end 36 of the upper arm 22, permitting a portion of the upper arm to extend beyond the connection point. The load transfer link 26 of the alternative embodiment comprises a hydraulic cylinder 60. The hydraulic cylinder 60 is pivotally connected between the second end 36 of the upper arm 22 and the vibrator 15. The hydraulic cylinder 60 may be either manually or automatically controlled. Alternative structures for the load transfer link 26 of the embodiment of FIG. 2 are contemplated, such as a coil spring or elastomeric member.

The load transfer link 26 can be used to affect the linkage assembly 14 to make the skid shoes 56 float, rise, or be firmly loaded against the ground. By connecting load or position sensors (not shown) to the skid shoes 56 or the load transfer link 26, the balancing, contour following, and plow 10 reaction to variable soil conditions could be automated by continuously varying the length of the hydraulic cylinder 60 or the biasing effect of the link. Automated control of the lift cylinder 32 may ease operator control of depth of the plow blade 16.

Figure 3:
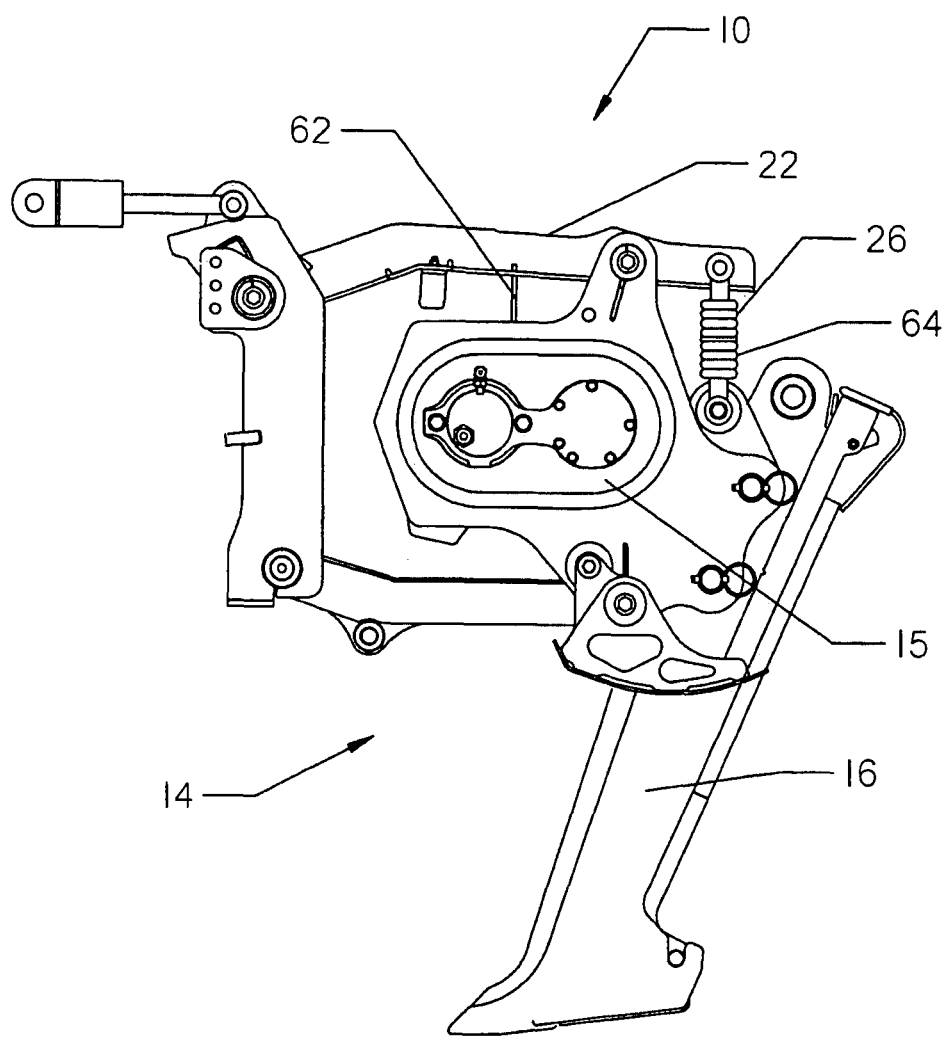
FIG. 3 show an alternative embodiment for the linkage assembly of FIG. 2.

Turning now to FIG. 3, shown therein is an alternative embodiment further comprising a visual indicator 62. Preferably, the visual indicator 62 comprises a member with alignment markings attached to an upper surface of the vibrator assembly 15. The visual indicator 62 may be used to show the relative position of the vibrator assembly 15 and the upper arm 22 to an operator. Maintaining the vibrator 15 in proper float orientation by adjusting the length of lift cylinder 32 is beneficial to control plow blade 16 depth and the amount of vibration transferred to the tool carrier 12.

With continued reference to FIG. 3, an alternative embodiment for the load transfer link 26 is also shown. The link 26 shown therein comprises a double-biased elastomeric member 64. The elastomeric member 64 may be biased to impart a desired force on the plow blade 16. Preferably, the elastomeric member 64 can be biased in either direction as required by soil conditions. In some soil, for example, the plow blade 16 tends to ride out of the ground, while in others the plow tends to exert a downward force on the linkage assembly 14. The elastomeric member 64, when properly biased, allows the plow blade 16 to follow the contour of the ground without transferring unwanted vibration to the tool carrier 12.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A linkage assembly for use with a vibratory plow, the assembly comprising:
   an arm;
   a vibrator assembly, connected to the arm; and
   a load transfer link, operatively connected at a first point to the arm, and operatively connected at a second point to the vibrator assembly;
   wherein the load transfer link comprises a leaf spring, having a first end, a second end, and a center portion, the first end pivotally connected to the arm at the first point, the center portion fixedly attached to the vibrator assembly proximate where the vibrator is connected to the arm.

2. The assembly of claim 1, wherein the load transfer link further comprises an intermediate link, having a first end and a second end, the intermediate link being pivotally attached at its first end to the second end of the leaf spring, and being pivotally attached at its second end to the vibrator assembly.

3. The assembly of claim 2 wherein the intermediate link comprises a shackle.

4. The assembly of claim 2 wherein the intermediate link comprises a hydraulic cylinder.

5. The assembly of claim 2 wherein the intermediate link comprises an elastomeric member.

6. The assembly of claim 5 wherein the elastomeric member is biased.

7. The assembly of claim 2 wherein the intermediate link comprises a coil spring.

8. The assembly of claim 1 further comprising at least one skid shoe, connected to the vibrator and adapted to contact the surface of the ground during operation of the linkage assembly.

9. The assembly of claim 1 further comprising a plow blade assembly, connected to the vibrator assembly.

10. The assembly of claim 1 further comprising a lift trolley, operably connected to an end of the arm, and movably connectable to a tool carrier.

11. A linkage assembly for linking a work vehicle with a vibratory plow, the assembly comprising:
    an arm comprising a first end, a second end, and a middle portion;
    wherein arm is positioned such that the second end is remote from the work vehicle and the first end is proximate the work vehicle;
    a vibrator assembly, connected to the arm; and
    a load transfer link, operatively connected at a first point to the arm, and operatively connected at a second point to the vibrator assembly;
    wherein the load transfer link comprises a hydraulic cylinder; and
    wherein the vibrator assembly is connected to the arm at a middle portion of the arm such that the second end of the arm extends beyond the vibrator assembly, and wherein the first point is proximate the second end of the arm.

12. The assembly of claim 11 wherein the cylinder is automatically controlled.

13. A linkage assembly for linking a work vehicle with a vibratory plow, the assembly comprising:
    an arm comprising a first end, a second end, and a middle portion;

wherein arm is positioned such that the second end is remote from the work vehicle and the first end is proximate the work vehicle;

a vibrator assembly, connected to the arm; and a load transfer link, operatively connected at a first point to the arm, and operatively connected at a second point to the vibrator assembly;

wherein the load transfer link comprises an elastomeric member; and wherein the vibrator assembly is connected to the arm at a middle portion of the arm such that the second end of the arm extends beyond the vibrator assembly, and wherein the first point is proximate the second end of the arm.

14. The assembly of claim 13 wherein the elastomeric member is double-biased.

15. The assembly of claim 13 further comprising a plow blade assembly, connected to the vibrator assembly.

16. The assembly of claim 13 further comprising a lift trolley, operably connected to an end of the arm, and movably connectable to a tool carrier.

17. The assembly of claim 16 further comprising a second arm, connected at a first end to the trolley and connected at a second end to the vibrator assembly.

18. The assembly of claim 13 further comprising at least one skid shoe, connected to the vibrator and adapted to contact the surface of the ground during operation of the linkage assembly.

* * * * *